June 10, 1958 C. E. COMPTON 2,838,295

BIT HOLDER FOR HOLDING A PLURALITY OF BITS

Filed Oct. 26, 1956

*INVENTOR.*
Charles E. Compton

BY Hooper, Leonard & Bull
his attorneys

United States Patent Office 2,838,295

Patented June 10, 1958

2,838,295

BIT HOLDER FOR HOLDING A PLURALITY OF BITS

Charles E. Compton, Bridgeport, W. Va.

Application October 26, 1956, Serial No. 618,624

6 Claims. (Cl. 262—33)

This invention relates to multiple bit structure for mining apparatus and the like comprising a bit holder for holding a plurality of bits with improved provision for holding the bits in place in the holder.

In conventional so-called multiple bit blocks the individual bits are held in place in the block by separate holding means appropriated individually to the bits. Each time the bits are to be changed the individual holding means for each bit must be rendered inoperative, the bit replaced and the individual holding means thereafter rendered operative. The holding means are conventionally in the form of screws which have to be more or less laboriously turned in and out. The manipulation of a separate holding screw for each bit is time consuming so that the labor cost in changing bits is substantial.

I have devised multiple bit structure comprising a bit holder or block adapted to receive a plurality of bits with greatly simplified bit holding means. I may employ but a single bit holding screw, for example, in connection with two or more bits. The labor and time incident to bit changing are greatly reduced and the cost of the multiple bit structure may be less than the cost of a conventional multiple bit block.

I provide multiple bit structure for mining apparatus and the like comprising a bit holder having therein bit sockets each extending inwardly of the bit holder from the exterior thereof, the bit sockets intersecting, bits in the sockets, one bit when introduced into its socket engaging another bit so as to hold the second mentioned bit in place in its socket, and means holding the first mentioned bit in place in its socket. Thus the holding means for one bit may be another bit so that extraneous holding means for only one of the bits is required. Several bits may hold one another in place in sequence; I have found it practical to utilize as many as four bits in an operative group, the second bit holding the first bit in place in its socket, the third bit holding the second bit in place in its socket and the fourth bit holding the third bit in place in its socket. Extraneous holding means is needed only for the fourth bit.

When the bits are to be changed the holding means is rendered inoperative, the bit held by the holding means is removed and thereafter the bit held by that bit is removed, which process is further repeated if there are more than two bits in the operative group. The extraneous means for holding one of the bits in place in its socket may, as above indicated, be screw means threaded into the bit holder.

The bit sockets of my bit holder intersect to provide a space common to the sockets and each of the bits has a portion in that common space. The portions of the bits in the common space engage each other whereby one bit blocks withdrawal of another bit from its socket, the latter mentioned bit being held in place in its socket by extraneous holding means.

One of the bits may have a lateral projection and another bit when introduced into its socket may engage said lateral projection and thereby hold the first mentioned bit in place in its socket. One bit may have therein a recess and another bit when introduced into its socket may enter said recess and thereby hold the first mentioned bit in place in its socket. The lateral projection may define one limit of the recess. Preferably for bit manufacturing economy and simplification of handling bits in the field all of the bits are made of uniform construction.

I further provide multiple bit structure for mining apparatus and the like comprising a bit holder having therein bit sockets extending into the bit holder in generally the same direction but at different angles so that the edges of the sockets intersect, bits in the sockets, one bit having a recess in its side, another bit when introduced into its socket entering the recess in the side of the first mentioned bit and thereby holding the first mentioned bit in place in its socket, and means holding the second mentioned bit in place in its socket.

Preferably the bits may be insertable into the sockets to face in either of two opposite directions as desired, one bit having a recess in its side, another bit when introduced into its socket entering the recess in the side of the first mentioned bit and thereby holding the first mentioned bit in place in its socket, the bit holder having holding means receiving passages extending thereinto generally transversely of the bit sockets, one of such passages intersecting each bit socket, and holding means may be provided selectively insertable into said passages depending upon the orientation of the bits in their sockets to hold the second mentioned bit in place in its socket. Each bit may have a lateral projection, one bit when introduced into its socket engaging said lateral projection of another bit and thereby holding the second mentioned bit in place in its socket, the bit holder having holding means receiving passages extending thereinto generally transversely of the bit sockets, one of such passages intersecting each bit socket, and holding means may be provided selectively insertable into said passages depending upon the orientation of the bits in their sockets to engage said lateral projection of the first mentioned bit to hold the first mentioned bit in place in its socket.

Other details, objects and advantages of the invention will become apparent as the following description of a present preferred embodiment thereof proceeds.

In the accompanying drawings I have shown a present preferred embodiment of the invention in which—

Figure 1:
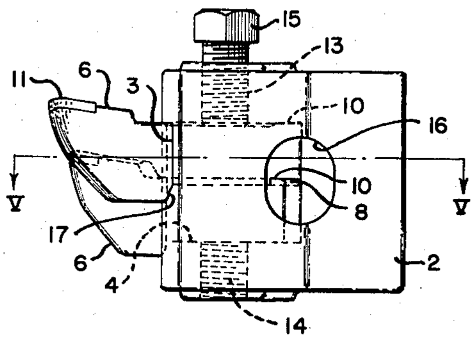
Figure 1 is a side view of a multiple bit structure for mining apparatus and the like embodying my invention.
Figure 4:
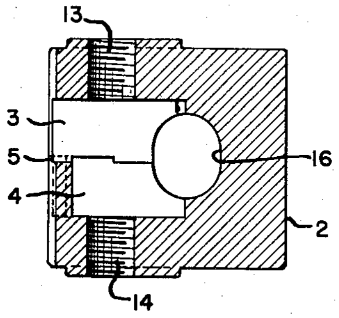
Figure 4 is a cross-sectional view taken on the line IV—IV of Figure 2 but with the bits and holding screw removed.
Figure 2:
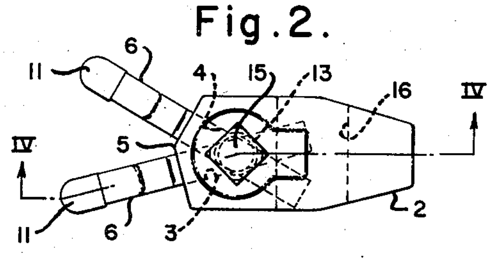
Figure 2 is a view of the structure shown in Figure 1 as it appears from above in Figure 1.

Referring now more particularly to the drawings, I provide a bit holder or so-called bit block designated generally by reference numeral 2. The bit block may take many forms and may accommodate two or more bits. The form of the bit block is dependent upon the particular apparatus in which it is to be used. The bit block shown in the drawings is designed to accommodate two bits.

Figure 3:
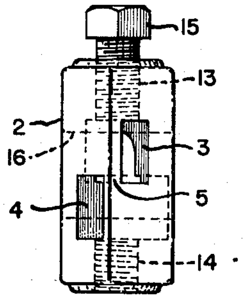
Figure 3 is a front view of the bit holder with the bits removed.
Figure 5:
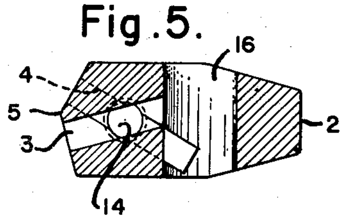
Figure 5 is a cross-sectional view taken on the line V—V of Figure 1 but with the bits removed.
Figure 6:
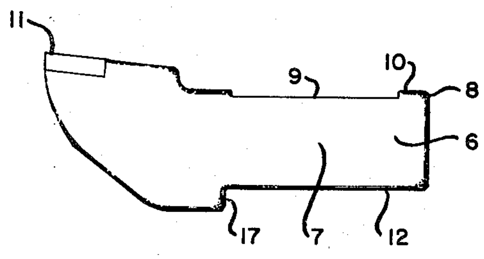
Figure 6 is a face view of one of the bits.

Entering the bit block from the exterior thereof are two bit sockets designated respectively 3 and 4. The bit sockets 3 and 4 are shown as being of generally rectangular cross section to receive bit shanks of similar cross section. The bit sockets 3 and 4 are shown extending into the bit block 2 in generally the same direction but at different angles so that the edges of the sockets intersect. As viewed from the front of the bit holder the sockets overlap as shown in Figure 3. They intersect at the interior of the bit block providing space 5 which is common to the sockets. If each bit shank were of uniform cross section the same as that of the socket it is obvious that after one bit shank had been inserted into one of the sockets the other bit shank could not be inserted into its socket to extend beyond the first mentioned bit shank. The bit shanks are of uniform thickness but in width, i. e., the up and down direction viewing Figure 6, they are of non-uniform dimension. Figure 6 shows a bit designated generally by reference numeral 6 having a shank 7 whose thickness is such as to enable it to be guidingly received so far as movement normal to its thickness is concerned, in one of the sockets 3 and 4 and whose extremity 8 is of a width substantially filling one of the sockets 3 and 4 in the corresponding direction. However, beyond the extremity 8 the shank 7 is reduced in width to form a recess 9. The portion of the extremity 8 at the end of the recess forms a lateral projection 10. The cutting edge of the bit is shown at 11.

The bits may be inserted into the sockets to face in either of two opposite directions as desired; that is to say, the cutting edges 11 may face either upwardly or downwardly viewing Figure 1. If the cutting edges 11 are to face downwardly a bit is first inserted into the socket 3 whereafter a bit is inserted into the socket 4. The rear edge 12 (Figure 6) of the shank of the bit in the socket 4 enters the recess 9 of the bit in the socket 3 and thus positively locks in place in its socket the bit in the socket 3. If the bits are to face in the opposite direction a bit is first inserted into the socket 4 whereafter a second bit is inserted into the socket 3, the bit in the socket 3 having the portion 12 of its shank within the recess 9 of the bit in the socket 4 and locking that bit in place in its socket.

Thus extraneous holding means are required only for holding one of the two bits in place in its socket since one bit holds the other in place. I provide in the bit block 2 opposed bores 13 and 14 which are internally threaded, the bore 13 intersecting the socket 3 and the bore 14 intersecting the socket 4. A holding screw 15 is threadedly insertable into either of the threaded bores 13 and 14. It will always be screwed into the bore in which is disposed the bit which is not already held in place in its socket by the other bit. Thus when the cutting edges 11 of the bits face upwardly viewing Figure 1 the holding screw 15 will be inserted in the bore 13 and when the cutting edges 11 of the bits face downwardly viewing Figure 1 the holding screw 15 will be inserted into the threaded bore 14. In each case the leading end or nose of the holding screw enters the recess 9 near the projection 10 of the bit in the socket intersected by the threaded bore into which the holding screw is inserted and the holding screw is tightened to firmly hold the bit in place in its socket. Even if the holding screw should become slightly loosened the bit could only partake of slight movement outwardly of its socket before the projection 10 would engage the holding screw 15.

The bit block 2 is shown as provided with a transverse opening 16 to prevent material from filling the sockets 3 and 4. By reason of the provision of the opening 16 the bottoms of the sockets 3 and 4 are open so that any material entering the upper ends of the sockets passes out through the lower ends thereof and through the opening 16.

When the bits are inserted into the sockets the shanks 7 of the bits move downwardly in the sockets until the shoulders 17 of the bits (Figure 6) strike against the outer surface of the block 2 at the mouths of the respective sockets. The angle of intersection of the sockets and the length of the bit shanks and of the extremities 8 and recesses 9 is such that the holding bit maintains the held bit against substantial movement outwardly of its socket. The held bit may partake of slight movement in the outward direction before its projection 10 engages the portion 12 of the holding bit but such movement is immaterial in operation. Also the holding screw 15 permits only slight movement of the bit held by it in the outward direction before the projection 10 of the bit engages the holding screw.

The bit block may be elongated in the up and down direction viewing Figures 1 and 3 and as indicated above I can increase the number of sockets and hence the number of bits held by the block with each bit except the bit at one end holding its neighbor in place. I have found it to be practical to mount four bits in a single holder with each bit holding its neighbor in place in its socket except the bit at one end which is held in place in its socket by a holding screw. Preferably the bits are arranged at various angles so that in use no two bits track one behind the other.

While I have shown and described a present preferred embodiment of the invention it is to be distinctly understood that the invention is not limited thereto but may be otherwise variously embodied within the scope of the following claims.

I claim:

1. Multiple bit structure for mining apparatus and the like comprising a bit holder having therein bit sockets each extending inwardly of the bit holder from the exterior thereof, the bit sockets intersecting, bits in the sockets, one bit having a lateral projection, another bit when introduced into its socket engaging said lateral projection and thereby holding the first mentioned bit in place in its socket, and means connected with the holder and exerting restraining force against the second mentioned bit only holding the second mentioned bit in place in its socket.

2. Multiple bit structure for mining apparatus and the like comprising a bit holder having therein bit sockets each extending inwardly of the bit holder from the exterior thereof, the bit sockets intersecting, bits in the sockets, one bit having therein a recess, another bit when introduced into its socket entering said recess and thereby holding the first mentioned bit in place in its socket, and means connected with the holder and exerting restraining force against the second mentioned bit only holding the second mentioned bit in place in its socket.

3. Multiple bit structure for mining apparatus and the like comprising a bit holder having therein bit sockets extending into the bit holder in generally the same direction but at different angles so that the edges of the sockets intersect, bits in the sockets, one bit having a recess in its side, another bit when introduced into its socket entering the recess in the side of the first mentioned bit and thereby holding the first mentioned bit in place in its socket, and means connected with the holder and exerting restraining force against the second mentioned bit only holding the second mentioned bit in place in its socket.

4. Multiple bit structure for mining apparatus and the like comprising a bit holder having therein bit sockets extending into the bit holder in generally the same direction but at different angles so that the edges of the sockets intersect, bits in the sockets, the bits being insertable into the sockets to face in either of two opposite directions as desired, one bit having a recess in its side, another bit when introduced into its socket entering the recess in the side of the first mentioned bit and thereby holding the first mentioned bit in place in its socket, the bit holder having holding means receiving passages extending thereinto generally transversely of the bit sockets, one of such passages intersecting each bit socket, and holding means selectively insertable into said passages depending upon the orientation of the bits in their sockets to hold the second mentioned bit in place in its socket.

5. Multiple bit structure for mining apparatus or the like comprising a bit holder having therein bit sockets each extending inwardly of the bit holder from the exterior thereof, the bit sockets intersecting, bits in the sockets, the bits being insertable into the socket to face in either of two opposite directions as desired, each bit having a lateral projection, one bit when introduced into its socket engaging said lateral projection of another bit and thereby holding the second mentioned bit in place in its socket, the bit holder having holding means receiving passages extending thereinto generally transversely of the bit sockets, one of such passages intersecting each bit socket, and holding means selectively insertable into said passages depending upon the orientation of the bits in their sockets to engage said lateral projection of the first mentioned bit to hold the first mentioned bit in place in its socket.

6. Multiple bit structure for mining apparatus and the like comprising a bit holder having therein bit sockets each extending inwardly of the bit holder from the exterior thereof, the bit sockets entering the bit holder at different angles so that they are in substantially criss-cross arrangement and overlapping each other within the bit holder, the sockets being shaped so that each bit upon insertion into a socket is peripherally confined so as to be guided by that socket to move substantially in a predetermined path, a bit in each socket, at least one of the bits having a projecting portion which as that bit is inserted into its socket protrudes into another socket so that it lies behind the bit in such other socket when the second mentioned bit is inserted into its socket whereby the second mentioned bit blocks withdrawal of the first mentioned bit from its socket, and means holding the second mentioned bit in place in its socket.

References Cited in the file of this patent

FOREIGN PATENTS

| | | |
|---|---|---|
| 10,579 | Great Britain | of 1898 |
| 22,042 | Great Britain | of 1902 |